Oct. 25, 1960

C. B. AIKEN 2,958,080
SCANNING SYSTEM FOR DETECTING A RADIANT OBJECT
IN A FIELD OF LIKE RADIATION
Filed Sept. 7, 1946

INVENTOR:
CHARLES B. AIKEN
BY:
Campbell, Brumbaugh & Free
his ATTORNEYS

United States Patent Office 2,958,080
Patented Oct. 25, 1960

2,958,080

SCANNING SYSTEM FOR DETECTING A RADIANT OBJECT IN A FIELD OF LIKE RADIATION

Charles B. Aiken, R.D. 1, Wilton, Conn.

Filed Sept. 7, 1946, Ser. No. 695,567

9 Claims. (Cl. 343—16)

The present invention relates to scanning systems and more particularly to a novel scanning system which affords improved discrimination between a source of radiant energy which is to be detected and the background against which the source is viewed.

The practice of using a scanning system to detect a relatively small and well defined body in space is well known. Scanning systems have been built that operate in response to light, heat, radio or other radiant energy signals received from the body being sought. In all such systems used heretofore, however, the range of detection has been seriously limited by the inability of the system to discriminate between signals from the object being sought and spurious signals emanating from the background against which the scanning system views the object. This background is often very large, and special and complex means have been required in the past to minimize its effects so that a reasonable range of detection may be realized.

It is an object of the invention, accordingly, to provide a new and improved scanning system which enables signals from the object being sought to be readily discriminated from spurious background signals.

A further object of the invention is to provide a new and improved scanning system of the above character in which discrimination against background signals is improved by utilizing a harmonic instead of the fundamental signal output from the detector.

Although the invention is applicable to different types of scanning systems utilizing light, thermal radiation, radio or other phenomena, it will be considered first, for simplicity, as applied to a conventional to-and-fro scanning system responsive to thermal radiation.

Figure 1:
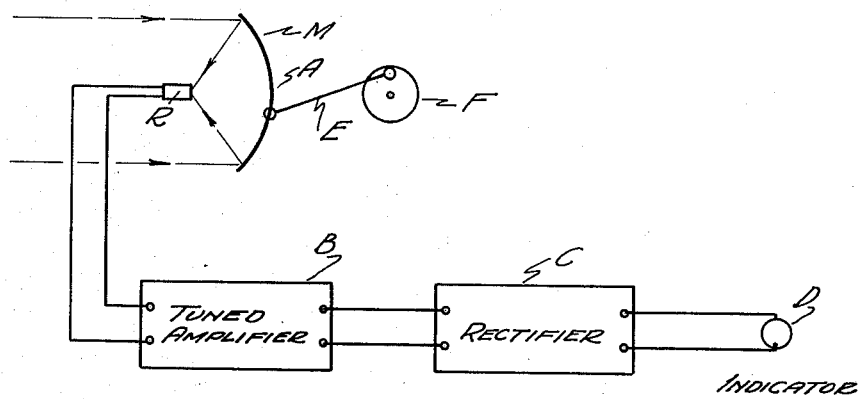
Figure 3:
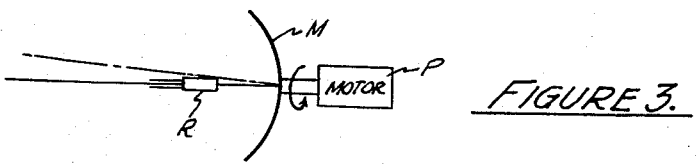
Figure 2:
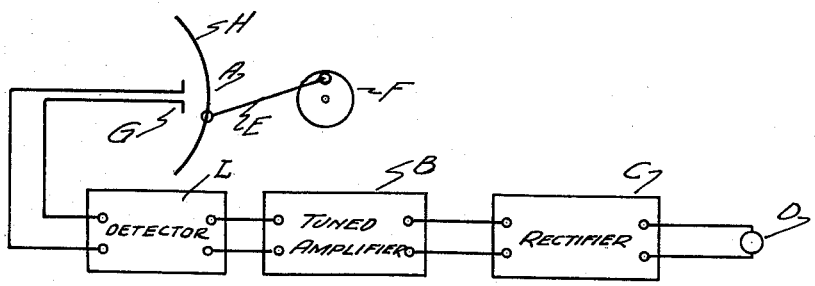
Figure 2:
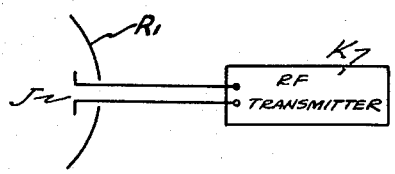

Additional objects and advantages of the invention will be apparent from the following detailed description, taken in conjunction with the acompanying drawing, in which Figure 1 illustrates schematically a scanning system constructed according to the invention for detecting a radiant object;

Figure 2 illustrates schematically another embodiment of the invention utilizing radio waves; and Figure 3 is a schematic diagram of a modification utilizing rotary scanning.

In Figure 1 is shown a simple block diagram of a receiving system comprising, for example, a concave reflector M, a receiver R which may be a bolometer or thermocouple, a tuned amplifier B for greatly amplifying the output of R, a rectifier C for rectifying the amplifier output, and a meter D for indicating the output from the rectifier C. The reflector M is adapted to be oscillated about an axis A perpendicular to the plane of the paper, by means of the crank E which is driven by a motor F. The axis A may be located either in front of or behind the reflector M, as desired, instead of passing through the vertex as shown. For example, the axis of rotation A might be located at the receiver R. This presents some advantages from an optical standpoint since the relation between the receiver R and the reflector M is then fixed, and no optical coma is developed during the scanning cycle, as occurs when a parabolic reflector is used and the axis A does not pass through R.

Heretofore, it has been the practice to use an amplifier B which is either of very broad band width or is tuned to the fundamental frequency of the scanning system. In either case, very strong responses to irregularities in the background are developed, and the range at which targets can be detected, under many conditions of practical operation, is therefore limited.

By way of illustration, let it be supposed that the scanning motion is parallel to the horizon and that the intensity of the background varies in direct proportion to the azimuth angle from true north at which the "beam" of the receiver is pointing. During the course of a scanning cycle, the received energy will therefore steadily increase as the reflector M turns from north to south, and will decrease during the reverse motion. If the scanning frequency is 10 cycles, for example, a strong 10 cycle signal will be generated by the background, even though no target is present.

The present invention is based upon the theory, which has been confirmed by experiment and by practical operation, that the signal from the background can be greatly reduced if a harmonic of the heat receiver output is selected by means of a tuned amplifier, the fundamental frequency being rejected. It can be shown that where the background intensity gradient is uniform along the direction of the scanning motion, as in the above example, no false signal whatever will be generated by the background. If the variations in background with azimuth are gradual, so that the first and higher order derivatives of background intensity with respect to azimuth angle are small, then false signals of the various harmonic frequencies will also be small.

This can be shown by assuming that the total energy from the background focused on the heat receiving element (R of Figure 1) can be expressed as a function of the azimuth angle of the reflector M, and can be represented by a smooth curve. This curve may be defined mathematically by a series of the form $$W_N = A_0 + A_1(x-x_0) + A_2(x-x_0)^2 + \ldots \quad (1)$$

in which $x_0$ is the azimuth angle of the axis of the scanner, and $(x-x_0)$ is the angular departure of the reflector M at any instant from its central position. The quantities $A_1$, $A_2$, etc., are proportional to the first, second, etc., derivatives of the curve of background intensity versus azimuth angle.

When the reflector M is oscillated sinusoidally with amplitude S, $$x - x_0 = S \cos \omega_t \quad (2)$$

If it is assumed that the frequency characteristic of the receiver R is flat in the range which includes the first several harmonics of the scanning frequency, the fundamental component of output voltage will be proportional to the corresponding component of the energy falling on the receiver R. By inserting Equation 2 into Equation 1, it is shown that the fundamental component of the energy is $$W_{N_1} = \left(A_1 S + \frac{3A_3 S^3}{4} + \ldots\right) \cos \omega_t \quad (3)$$

while the second-harmonic component is $$W_{N_2} = \left(\frac{A_2 S^2}{2} + \frac{A_4 S^4}{2} + \ldots\right) \cos 2\omega_t \quad (4)$$

Wherever the variations in background intensity with azimuth are not very rapid, $A_2$ will always be considerably smaller than $A_1$, while the coefficients of higher orders will be smaller still. It follows, therefore, that the optical background noise developed by tuning to the second harmonic will be substantially less than that resulting when the fundamental-frequency component is utilized.

By similar reasoning, it can be shown that if a harmonic higher than the second is used the reduction in background noise will be still greater.

In the case of to-and-fro scanning, the desired signal generated by a target will have substantial harmonic components, and if the second harmonic is used the response will be almost as great as if the fundamental were employed, provided the value of scanning angle amplitude is correct. This fact has been experimentally confirmed. With circular scanning this is not necessarily so, although the second harmonic content can be increased by using an optical system which will make the pulse generated as the "beam" sweeps across the target fairly sharp.

When higher harmonics are used, there is a tendency for the target response to fall off, but in the case of the third harmonic entirely satisfactory signals can be obtained with to-and-fro scanning, and also with circular scanning if the target pulse is not too broad. Very material improvement in the signal-to-background-noise ratio can be obtained by using either the second or third harmonic, and entirely worthwhile improvement can be achieved with the fourth and fifth harmonics.

The improvement that can be actually realized will depend upon the amplitude of the scanning angle. If the reflector M is oscillated about a vertical axis with a total swing of 1 degree, the scanning angle amplitude $\sigma$ would be ½ degree, or one half the total swing. When the second harmonic is used, the background noise generated is proportional to $\sigma^2$, while if the $n$th harmonic is used the noise voltage is proportion to $\sigma^n$. These relations are true only if $\sigma$ is moderately small. It is evident that for the maximum signal-to-background-noise ratio, the smallest scanning angle should be used that is consistent with the development of a satisfactory signal from the target.

In a practical case, scanning systems according to the invention may be employed to locate a body such as a ship, for example, in complete darkness against a background of sea or of sea and sky together. In this case, the infra-red radiation from the ship (about $10\mu$ wave length) is to be picked up by the receiver R (Fig. 1) and must be distinguished from similar radiation originating in, or reflected from clouds, water, or even land masses which might form the background of the ship. This may be effectively accomplished according to the invention by tuning the amplifier B to a harmonic of the signal received by the receiver R and using as small a scanning angle $\sigma$ as is consistent with the development of a satisfactory signal from the target.

Another possible application of the invention is in the detection of incipient forest fires in thinly settled country. Either infra-red or visible wave length radiation may be employed. If the medium wave length ($10\mu$) infra-red radiation is used, the receiver R is made responsive to heat as in the case of ship detection. On the other hand, if short infra-red radiation, in the vicinity of $1\mu$ wave length, for example, is employed, or if reliance is placed on visible light, then the receiver R may comprise a conventional type photoelectric cell. This would have the advantage of greatly increased sensitivity, since the photoelectric cell is inherently a much more sensitive device than a thermocouple or a bolometer.

Whatever type of receiver R is employed, considerable background interference will be experienced. In the middle infra-red band, the earth and clouds radiate strongly, while in the short infra-red or visible range moonlight is capable of causing a substantial background illumination at night and strong backgrounds would obviously exist in the day time.

In accordance with the invention, the reflector M (Fig. 1) may be slowly rotated at a rate of 2° or 3° per second, for example, so as to sweep out the area to be covered, and at the same time oscillated at say 10 cycles per second through an angle of the order of 1° total swing. With the amplifier B tuned to a harmonic, say 30 cycles per second, clearly distinguishable signals from the object sought may be observed, in spite of the background interference.

The invention may also be applied to scanning systems depending upon radio signals for their operation, which might be employed to locate a relatively small metal object, such as a steel roofed building, for example, located on partially reflecting ground. In such systems, a highly directive radio receiving system might be used to scan across a field "illuminated" by radiation from a less directive transmitter, it being assumed that the combined directivities of the transmitter and receiver are sufficiently great to prevent any direct reception. Under such conditions, considerable difficulty may be expected in segregating the signals reflected by the roof from other spurious signals reflected by the much larger area of surrounding earth.

For this application, a scanning system according to the invention may utilize light and easily directed receiving arrays. For example, a dipole antenna G at the focus of a parabolic reflector H, as shown in Figure 2, would be quite suitable, although by no means the only possible arrangement. The scanning rate could be much higher than in the thermal case, since even the best heat receivers are inherently rather sluggish, while the response of a radio receiving system to changes in input intensity can be made as rapid as desired. The chief limitation to the speed of scanning would be mechanical, if the directive receiver were physically moved. The field being viewed may be "illuminated" by any suitable source such as a dipole J powered by a radio frequency transmitter K, for example, and provided with a suitable reflector R1.

The output of the receiving dipole G would, of course, be a radio frequency alternating current instead of a direct current as in the case of the thermal receiver. In either case, the amplitude of the output is modulated by the variation in intensity of received signal as the directive system is swept across the target. Preferably the signal picked up is demodulated by a suitable detector L, for example. As in the previous examples, the amplifier B is tuned to a harmonic of the scanning frequency, so that clearly distinguishable signals may be received in spite of background interference.

Although only to-and-fro scanning systems have been considered above, it will be readily apparent that the invention applies equally to rotary scanning systems. In such systems, the optical axis of the reflector M might be set at a small angle to the line joining the receiver R and the vertex of the mirror M, so that the optical axis passes just outside the physical boundary of the receiver R, as shown in Fig. 3. The reflector M would then be rotated by any suitable motive means P, for example, at a regular rate about an axis passing through its vertex and through the receiver R.

From the foregoing, it will be apparent that the invention provides a novel scanning apparatus characterized by improved discrimination between signals from an object emitting radiant energy and spurious signals emitted by the background against which the object is viewed. By making the system responsive to a harmonic of the receiver output, the effects of undesired background interference may be minimized without materially affecting the signals from the object sought. The degree of discrimination is further increased according to the invention by using as small a scanning angle as possible, consistent with the development of a satisfactory signal from the target.

I claim:

1. In a scanning system for locating a continuously radiant object in space, the combination of a scanning receiver for receiving radiations from said object, scanning mechanism for causing said scanning receiver to scan periodically different zones of an area to be scanned and means non-responsive to signals of the scanning frequency in the output of said receiver but responsive to a harmonic thereof.

2. In a scanning system for locating an object continuously radiating thermal radiation, the combination of a receiver responsive to thermal radiation from said object, scanning mechanism for causing said receiver to scan periodically different zones of an area to be scanned, an electronic amplifier adapted to reject the fundamental of said scanning frequency and tuned to a scanning frequency harmonic of the output of said receiver, and means responsive to the output of said amplifier.

3. In a scanning system for locating an object continuously radiating visible radiation, the combination of a receiver responsive to radiation in the visible range from said object, scanning mechanism for causing said receiver to scan periodically different zones of an area to be scanned, an electronic amplifier adapted to reject signals of said scanning frequency and tuned to a scanning frequency harmonic of the output of said receiver, and means responsive to the output of said amplifier.

4. In a scanning system for locating an object continuously radiating radio waves, the combination of a receiver responsive to radio waves from said object, scanning mechanism for causing said receiver to scan periodically different zones to be scanned, means for demodulating the output of said receiver, an electronic amplifier receiving the output of said demodulating means and being tuned to a scanning frequency harmonic other than the fundamental in the output of said demodulating means, and means responsive to the output of said amplifier.

5. In a scanning system, the combination of a receiver, a reflector for said receiver, means for producing an oscillatory scanning motion of said reflector, the amplitude of said scanning motion being as small as possible consistent with the development of a satisfactory signal from a target, an amplifier tuned to a scanning frequency harmonic of the output of said receiver, and means responsive to the output of said amplifier.

6. A scanning system comprising a receiver, a reflector for said receiver, means for producing a relative compound scanning motion of said receiver, said compound motion including a two-and-fro motion of such amplitude as to permit a relatively wide area to be scanned, and an oscillatory motion of relatively small amplitude, an electronic amplifier tuned to a scanning frequency harmonic of the output of said receiver, means for rectifying the output of said amplifier, and means responsive to the output of said rectifying means.

7. In a scanning system, the combination of a receiver, a reflector for said receiver, means for producing a rotary scanning motion of said reflector, an amplifier tuned to a scanning frequency harmonic of the output of said receiver, and means responsive to the output of said amplifier.

8. A system for the detection of a reflecting object comprising, transmitting means for directing radiant energy toward said object and its immediate surroundings, a directive receiver responsive to energy of the type radiated by the transmitter, means for causing said receiver to scan periodically over said object, means for selecting a component of the output of said receiver that is a harmonic of the scanning frequency, and indicating means responsive to the output of said selecting means.

9. In a scanning system, the combination of a receiver, a reflector for said receiver, means for producing an oscillatory scanning motion of said reflector, an amplifier tuned to the $n$th harmonic of the scanning frequency, said amplifier being responsive to the $n$th harmonic component of the scanning frequency in the output of said receiver, and indicating means responsive to the output of said receiver, the amplitude of the scanning motion imparted to said reflector being such that the output of said amplifier is proportional to the $n$th power of the amplitude of the scanning motion when a relatively small object emitting radiant energy is viewed by the scanning system.

References Cited in the file of this patent
UNITED STATES PATENTS

| | | |
|---|---|---|
| 2,138,966 | Hafner | Dec. 6, 1938 |
| 2,307,316 | Wolff | Jan. 5, 1943 |
| 2,407,287 | Labin | Sept. 10, 1946 |
| 2,408,048 | Deloraine | Sept. 24, 1946 |
| 2,410,666 | Leck | Nov. 5, 1946 |
| 2,415,095 | Varian | Feb. 4, 1947 |
| 2,480,171 | White | Aug. 30, 1949 |